United States Patent

Okamoto et al.

[11] Patent Number: 6,118,874
[45] Date of Patent: Sep. 12, 2000

[54] ENCRYPTED DATA RECOVERY METHOD USING SPLIT STORAGE KEY AND SYSTEM THEREOF

[75] Inventors: Eiji Okamoto, 129-3, Nishiizumi-1-chome, Kanazawa-shi; Masahiro Mambo, 3-36-203, Seiryomachi, Aoba-ku, Sendai-shi; Seiichi Domyo, Fujisawa; Hiroyoshi Tsuchiya; Tooru Kawai, both of Yokohama; Kazuo Takaragi, Ebina; Naoya Torii, Kawasaki; Takeshi Tanida, Kanazawa, all of Japan

[73] Assignees: Hitachi, Ltd., Tokyo; Fujitsu Limited, Kawasaki; Eiji Okamoto, Kanazawa; Masahiro Mambo, Sendai, all of Japan

[21] Appl. No.: 09/050,066

[22] Filed: Mar. 30, 1998

[30] Foreign Application Priority Data

Mar. 31, 1997 [JP] Japan .................................. 9-080081

[51] Int. Cl.⁷ ............................. H04L 9/08; H04L 9/32
[52] U.S. Cl. ........................... 380/282; 380/46; 380/286; 713/156
[58] Field of Search .............................. 380/46, 281, 282, 380/286; 713/156, 173, 178

[56] References Cited

U.S. PATENT DOCUMENTS

| | | |
|---|---|---|
| 5,276,737 | 1/1994 | Micali ........................ 380/30 |
| 5,315,658 | 5/1994 | Micali ........................ 380/30 |
| 5,883,956 | 3/1999 | Le et al. ...................... 380/4 |
| 5,917,911 | 6/1999 | Dabbish et al. ............. 380/21 |

FOREIGN PATENT DOCUMENTS 8-506217  7/1996  Japan .............................. H04L 9/00

OTHER PUBLICATIONS

Denning, D., "Key Escrowing Today," IEEE Communications Magazine, vol. 32, No. 9, Sep. 1994, pp. 58–68.

"Fair Cryptosystems", MIT/LCS/TR–579,C,MA, Published Aug.11, 1994.

*Primary Examiner*—Tod R. Swann
*Assistant Examiner*—Justin T. Darrow
*Attorney, Agent, or Firm*—Antonelli, Terry, Stout & Kraus, LLP

[57] ABSTRACT

When a secret is encrypted and stored, it is necessary to provide a countermeasure for the situation where a key is lost (key recovery system). In the present invention, a key recovery system for an enveloped data format in which a common key is used to encrypt a plaintext (secret) and a user's public key is used to encrypt the common key and attached to an encrypted text is provided. In the present invention, only the common key is decrypted to recover the secret without reconstruction of split secret keys kept in a plurality of key storage apparatuses.

22 Claims, 9 Drawing Sheets

FIG.3
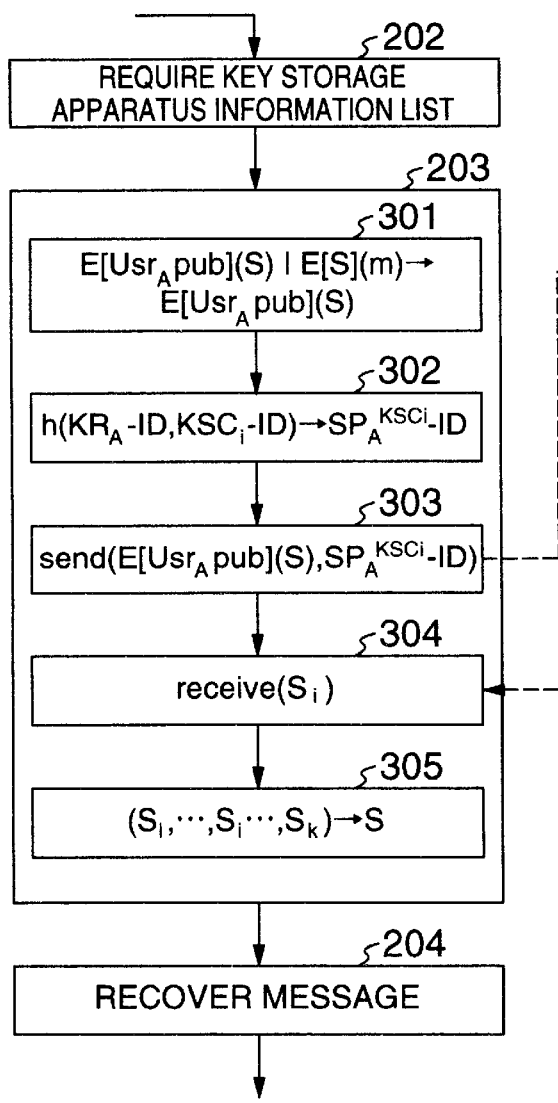
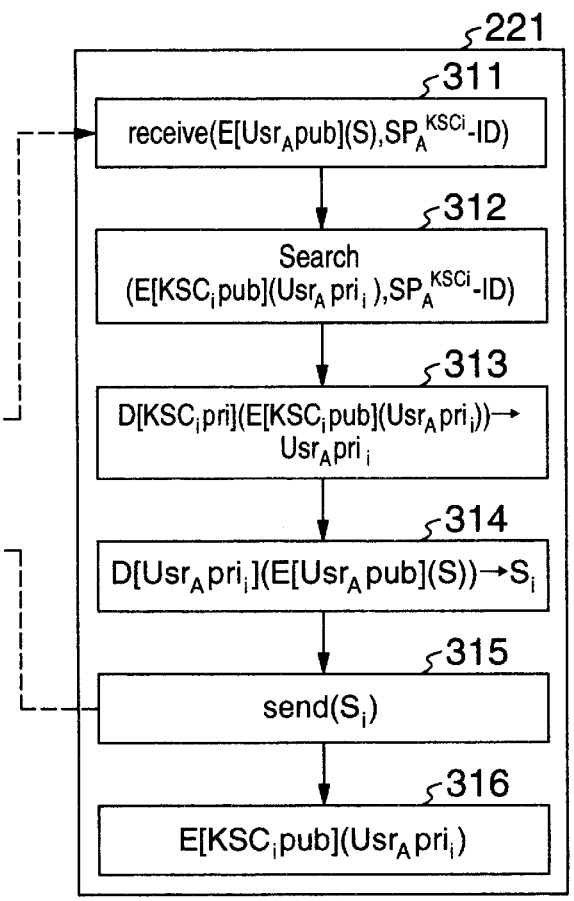

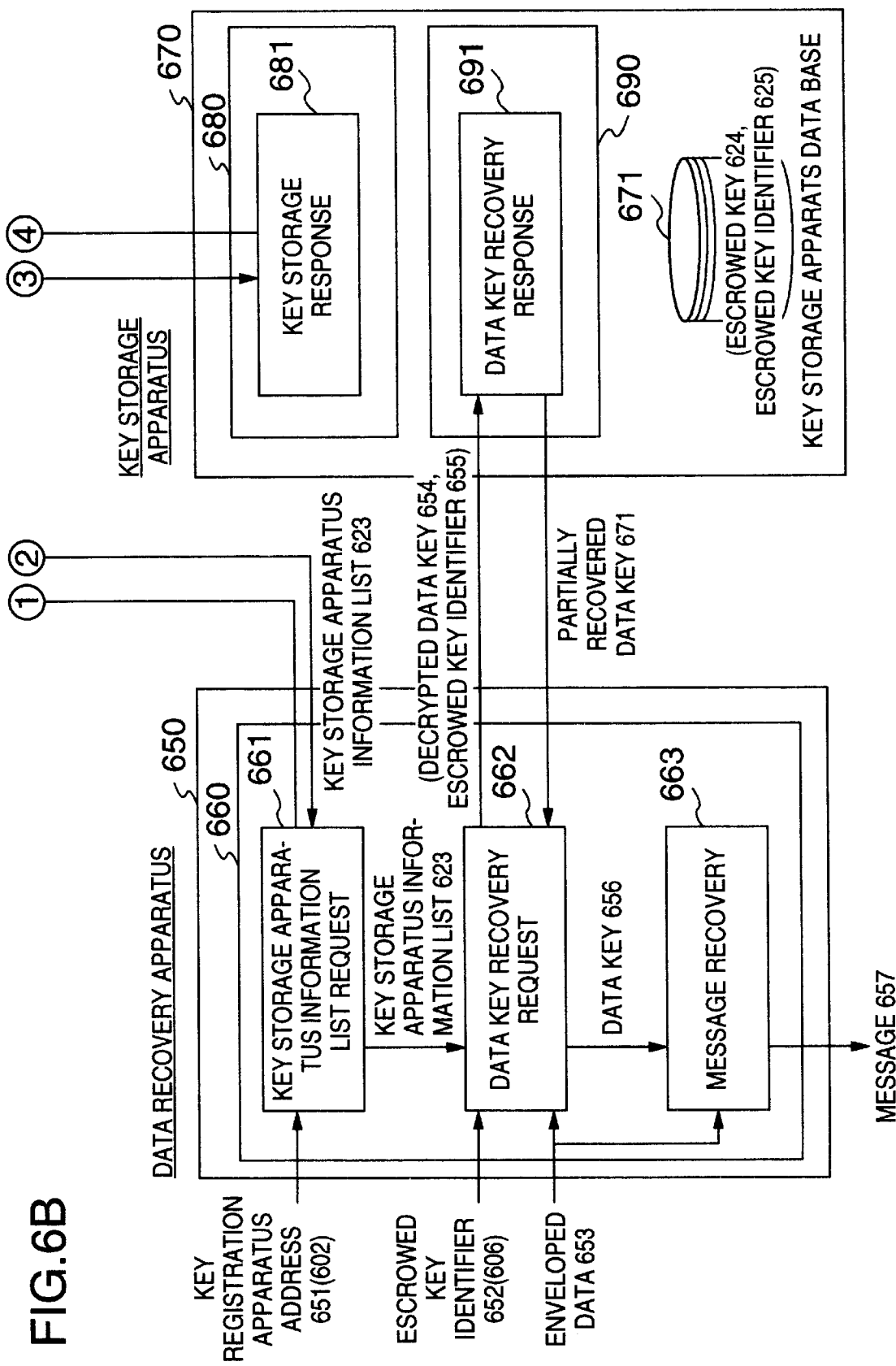

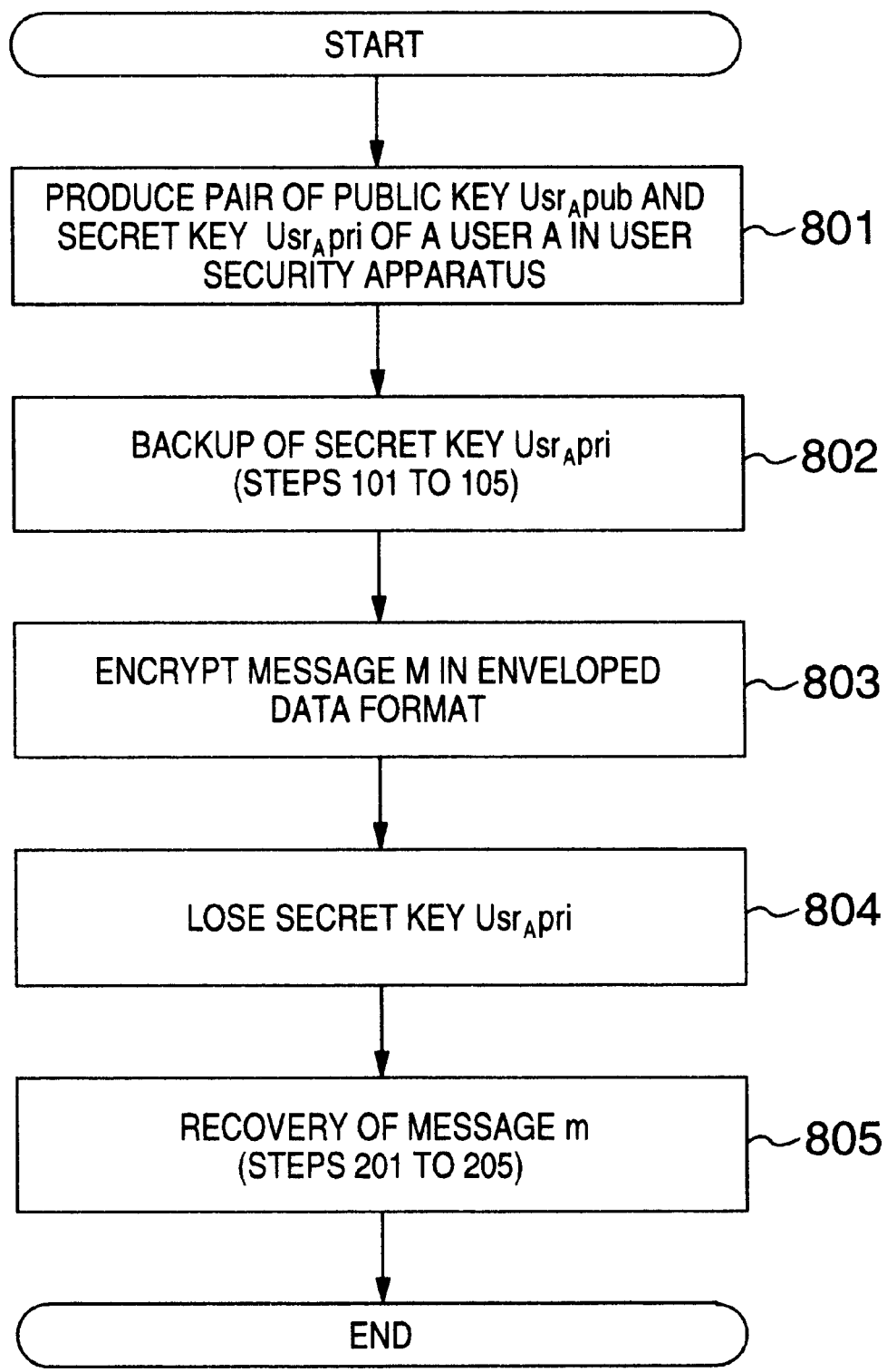

ENCRYPTED DATA RECOVERY METHOD USING SPLIT STORAGE KEY AND SYSTEM THEREOF

BACKGROUND OF THE INVENTION

1. Common Key Encryption, Public Key Encryption and Enveloped Data

Two common types of cryptographic system are common key encryption systems and public key encryption systems. Within cryptographic systems, there are encryption keys for encrypting a plaintext and decryption keys for decrypting a ciphertext.

The common key encryption system includes common encryption and decryption keys and particularly is suitable for an application in which a file is encrypted to keep a secret.

The public key encryption system includes different encryption and decryption keys. A user produces a pair of keys including a public key and a secret key. The public key is an encryption key and the secret key is a decryption key. Particularly, the public key encryption system is suitable for an application in which a communication text is encrypted to keep a secret. A transmitting party uses a receiving party's public key to encrypt a communication text and only the receiving party which is an owner of a secret key can use the secret key to decrypt the communication text.

When the user who encrypts plaintext is different from the user who decrypts the ciphertext, the common key encryption system requires that a mechanism be provided for safely delivering the common key from the first to the second user. The public key encryption system encounter this difficulty because the public key is published. On the other hand, the public key encryption system has a disadvantage in that processing performance for encryption and decryption is inferior as compared with the common key encryption system.

Computers connected through a network are used to realize a system in which secret information is owned jointly. These systems can exploit advantages of the public key encryption system and the common key encryption system to encrypt secret information in the form of enveloped data for the purpose of maintaining secrecy of a file and a communication path.

An example in which a reference person A and a preparation person B own secret information jointly is now described. (1) Even when an illegal person obtains enveloped data, contents thereof cannot be decrypted because the illegal person cannot obtain a secret key of the reference person. (2) The efficiency of using the enveloped data format capable of decrypting a plaintext at a high speed is exhibited.

In the following description, a public key of a user A is described as $Usr_A pub$, a secret key is described as $Usr_A pri$, and a common key (data key) for encrypting and decrypting a plaintext m is described as S. Further, to encrypt data X by means of a key K is described as $E[K](X)$ and to decrypt data Y by means of a key Y is described as $D[K](Y)$.

(1) The preparation person B prepares the common key S at random.
(2) The preparation person B encrypts the plaintext m by means of the data key S.
(3) The preparation person B encrypts the data key S used in (2) by means of the public key $Usr_A pub$ of the reference person A.
(4) The preparation person B transmits data $E[Usr_A pub](S)|E[S](m)$ (hereinafter referred to as enveloped data) in which the ciphertext $E[S](m)$ obtained in (2) and the data key $E[Usr_A pub](S)$ encrypted in (3) are combined with each other.
(5) The reference person A receives the enveloped data of (4).
(6) The reference person A decrypts the data key S from $E[Usr_A pub](S)$ of the enveloped data by means of the secret key $Usr_A pri$ of the reference person A.
(7) The reference person A decrypts the ciphertext $E[S](m)$ of the enveloped data by means of the data key S decrypted in (6) to obtain the plaintext m.

When there are a plurality of reference persons (reference persons A and C), the above steps (3) and (4) can be extended as described below. The procedure for the plurality of reference persons can be extended easily. Further, the total amount of data can be reduced as compared with the case where data $E[Usr_A pub](S)|E[S](m)$ and $E[Usr_C pub](S')|E[S'](m)$ are separately produced for the reference persons A and C, respectively.

(3)' The public key $Usr_A pub$ of the reference person A and the public key $Usr_C pub$ of the reference person C are used to encrypt the data key S.

(4)' The enveloped data $E[Usr_A pub](S)|E[Usr_C pub](S)|E[S](m)$ for the encrypted data keys $E[Usr_A pub](S)$ and $E[Usr_C pub](S)$ and the ciphertext $E[S](m)$ combined with each other is transmitted.

2. Key Recovery System

There is the possibility that secret information cannot be recovered because of a key being lost or the owner of a key becoming unavailable. Particularly, it is an economical loss whenever the secret information that cannot be recovered is used in the activity of an enterprise.

one effective approach to the above problem is to provide a system (key recovery system) in which a copy of a key is backed up or stored in a computer installed in a corporation so that the key can be recovered from the copy thereof.

The key recovery system is composed of a plurality of computer apparatuses including a user security apparatus (abbreviated to USC), a key storage apparatus (abbreviated to KSC), a key registration apparatus (abbreviated to KRC), a data recovery apparatus (abbreviated to DRC) and the like. In the following description, the subset procedure for data recovery, that is, the procedure for causing the system to restore a public key and secret key pair and recovery of an encryption key to be left to a user's responsibility is not named data recovery but is named key recovery (Both of them are discriminated from each other functionally, while the abbreviation of DRC indicating the data recovery apparatus is used in common to the key recovery apparatus in order to discriminate it from the key registration apparatus).

Generally, the key recovery system protects a key by providing for recovery of the key using the following method:

Keys are backed up in a key storage apparatus in which security against trouble is ensured as compared with a user security apparatus.
The key is divided or split and kept in separate key storage apparatuses in custody.
When the keys are transferred between the user security apparatus and the key storage apparatus, the keys are encrypted using another key.

In addition, when the secret key associated with a public key is protected, a conventional key recovery system includes the following key recovery system.

Split and restoration of a secret key using secret sharing (hereinafter referred to as SS).

Verification of the splitting of the secret key using verifiable secret sharing (hereinafter referred to as VSS).

Restoration of the secret key using blind decryption.

The above-mentioned key recovery technique concerning the user's secret key is described in, for example, Silvio Micali, "Fair Cryptosystems", MIT/LCS/TR-579. c, Laboratory for Computer Science, Massachusetts Institute of Technology, Cambridge, Mass., August 1994. Further, contents of the technique are disclosed in U.S. Pat. Nos. 5,276,737 and 5,315,658 and JP-A-8-506217.

The cryptograph technique used in the conventional key recovery system is now described in brief and the scope of the key recovery system is made clear.

(a) Split and Restoration of a Secret Key using the SS Technique

First, secret sharing (SS) is described. Secret sharing is a cryptograph technique having the following procedure:

(1) A distributer splits a secret S into n partial information pieces and delivers them to n custodians, respectively.

(2) The n custodians gather the respective partial information pieces $(S_1, S_2, \ldots, S_n)$ so that the original secret S can be restored. At this point, it is assured that when any illegal person gains access to the custodians, the original secret S cannot be restored even if any partial information piece $S_i$ is used.

Further, as enhancement of the SS technique, the secret sharing capable of restoring the secret S by using any k pieces of the partial information pieces $(S_1, S_2, \ldots, S_n)$ is named SS technique based on (k, n) threshold method.

The conventional key recovery system to which the SS technique is applied is next described.

A key recovery protocol (a) in the user security apparatus, the key storage apparatus and the key recovery apparatus is described.

The key recovery protocol (a) includes the following procedure:

(a1) Backup of key that split secret keys $Usr_Apri_i$ (i=1, . . . , n) in the user security apparatus USC are kept in the key storage apparatuses $KSC_i$ (i=1, . . . , n) in custody.

(a2) Recovery of the secret key that the split secret keys $Usr_Apri_i$ kept in the key storage apparatuses $KSC_i$ in custody are gathered to the key recovery apparatus DRC in which the secret key $Usr_Apri$ of the user A is reconstructed.

KEY RECOVERY PROTOCOL (a)

Backup of Key:

(1) The user security apparatus USC splits the secret key $Usr_Apri$ of the user A into n key pieces.

(2) The user security apparatus USC transmits the split secret key $Usr_Apri_i$ to the key storage apparatus $KSC_i$.

(3) The key storage apparatus $KSC_i$ keeps the received split secret key $Usr_Apri_i$ in custody.

(4) The above steps (2) and (3) are repeated between the user security apparatus USC and the key storage apparatuses $KSC_i$ a number of times equal to the division or split number n.

Recovery of Secret Key:

(5) The key recovery apparatus DRC requests the split secret key $Usr_Apri_i$ to the key storage apparatus $KSC_i$.

(6) The key storage apparatus $KSC_i$ searches its own apparatus and returns the split secret key $Usr_Apri_i$ to the key recovery apparatus DRC.

(7) The key recovery apparatus DRC receives the split secret key $Usr_Apri_i$ in response to (5).

(8) The above steps (5) to (7) are repeated between the key recovery apparatus DRC and the key storage apparatuses KSC a number of times equal to the split number n.

(9) The key recovery apparatus DRC combines n split secret keys $Usr_Apri_i$ to restore the secret key $Usr_Apri$.

(b) Split Method of Secret Key using VSS

First, VSS is described.

VSS is a cryptograph technique which uses the SS technique to allow the holder of the split partial information $S_i$ to verify whether the split partial information $S_i$ of the secret S is prepared exactly or not.

The key backup procedure of the key recovery protocol (a) has a problem in that the key storage apparatus cannot previously confirm that the reconstructible split secret key is kept in custody. As one solution of this problem, a conventional key recovery system to which the VSS technique is applied is described.

A key recovery protocol (b) in the user security apparatus, the key storage apparatus and the key recovery apparatus is described. The key recovery protocol (b) includes the following operations:

(b1) Backup of keys that the key storage apparatus $KSC_i$ (i=1, . . . , n) keeps split public key $Usr_Apub_i$ (i=1, . . . , n) in custody in addition to the split secret key $Usr_Apri_i$ (i=1, . . . , n).

(b2) Verification of split of the key that the split public keys $Usr_Apub_i$ kept in the key storage apparatus $KSC_i$ in custody are gathered to the key recovery apparatus DRC in which the public key $Usr_Apub$ of the user A is reconstructed. In this step (b2), the key recovery apparatus verifies the split of the secret information (secret key) by means of the public information (public key) and, as a result, the secret information is prevented from leaking outside of the key storage apparatus.

KEY RECOVERY PROTOCOL (b)

Backup of Key:

(1) The user security apparatus USC splits the secret key $Usr_Apri$ and the public key $Usr_Apub$ of the user A into n pieces, respectively.

(2) The user security apparatus USC transmits the split secret key $Usr_Apri_i$ and the split public key $Usr_Apub_i$ to the key storage apparatus $KSC_i$.

(3) The key storage apparatus $KSC_i$ keeps the received split secret key $Usr_Apri_i$ and split public key $Usr_Apub_i$ in custody.

(4) The above steps (2) and (3) are repeated between the user security apparatus USC and the key storage apparatuses KSC a number of times equal to the split number n.

Verification of Split Keys:

(5) The key recovery apparatus DRC requests the split secret key $Usr_Apri_i$ from the key storage apparatus $KSC_i$.

(6) The key storage apparatus $KSC_i$ searches its own apparatus and returns the split public key $Usr_Apub_i$ paired with the split secret key $Usr_Apri_i$ to the key recovery apparatus DRC.

(7) The key recovery apparatus DRC receives the split public key $Usr_Apub_i$ in response to (5).

(8) The above steps (5) to (7) are repeated between the key recovery apparatus DRC and the key storage apparatuses KSC a number of times equal to the split number n.

(9) The key recovery apparatus DRC combines the n split public keys $Usr_Apub_i$ to restore the public key $Usr_Apub$.

(10) The fact that the secret key $Usr_Apri$ is exactly split is verified indirectly by the fact that the public key $Usr_Apub$ described in a public key certificate of the user A and prepared separately is coincident with the public key $Usr_A pub$ restored in the step (9).

(c) Recovery of Secret Key using Blind Decryption

The blind decryption technique is a cryptographic technique whereby Alice, who has obtained a ciphertext encrypted using Bob's public key, decrypts the ciphertext without allowing the secret key owner, Bob, to view the contents of the plaintext. The blind decryption procedure whereby Alice requests Bob to decrypt a ciphertext is described.

(1) Alice encrypts $E[Usr_B pub](m)$ by means of an Alice's public key $Usr_A pub$ and transmits it to Bob.

(2) Bob decrypts $E[Usr_A pub](E[Usr_B pub](m))$ received from Alice by means of a Bob's secret key $Usr_B pri$.

(3) Bob calculates $D[Usr_B pri](E[Usr_A pub](E[Usr_B pub](m)))=E[Usr_A pub](D[Usr_B pri](E[Usr_B pub](m)))=E[Usr_A pub](m)$, assuming that the cryptograph algorithm being used produces the same result regardless of the order of calculation.

(4) Alice decrypts $E[Usr_A pub](m)$ received from Bob by means of Alice's secret key $Usr_A pri$ to obtain a plaintext m.

The procedure of decrypting the secret key using the SS technique, described in (a), has a problem in that an illegal person who has tapped communication between the key recovery apparatus and the key storage apparatus can conjecture the position of split secret keys required to reconstruct the secret key. As one solution of this problem, a conventional key recovery system to which the blind decryption technique is applied in addition to the SS technique is described.

The key recovery protocol (c) in the user security apparatus, the key storage apparatus and the key recovery apparatus is described. The key recovery protocol (c) includes the following operations:

(c1) Backup of split secret keys $Usr_A pri_i$ (i=1, ..., n) are encrypted by means of public keys $KSC_i$ (i=1, ..., n) of the key storage apparatuses and are kept in the key storage apparatuses $KSC_i$ (i=1, ..., n).

(c2) Recovery of secret key, wherein reconstruction of the secret key $Usr_A pub$ of the user A is concealed to the key storage apparatus $KSC_i$. In this step (c2), as a result the reconstructed secret key information is prevented from leaking outside of the key recovery apparatus.

KEY RECOVERY PROTOCOL (c)

Backup of keys:

(1) The user security apparatus USC splits the secret key $Usr_A pri_i$ of the user A into n pieces.

(2) The user security apparatus USC encrypts the split secret key $Usr_A pri_i$ by means of the public key $KSC_i pub$ of each key storage apparatus $KSC_i$ and transmits them.

(3) The key storage apparatus $KSC_i$ keeps the received $E[KSC_i pub](Usr_A pri_i)$ in custody.

(4) The above steps (2) and (3) are repeated between the user security apparatus USC and the key storage apparatus KSC a number of times equal to the split number n.

Recovery of Secret Key (5) The key recovery apparatus DRC requests a plurality of split secret keys including the split secret keys $E[KSC_i pub](Usr_A pri_i)$ of the user A from the key storage apparatuses $KSC_i$.

(6) The key storage apparatuses $KSC_i$ return the plurality of encrypted split secret keys, including the split secret keys $E[KSC_i pub](Usr_A pri_i)$ of the user A.

(7) The key recovery apparatus DRC encrypts $E[DRCpub](Usr_A pri_i)$ by means of the public key DRCpub of the key recovery apparatus and transmits it to the key storage apparatus $KSC_i$.

(8) The key storage apparatus $KSC_i$ decrypts $E[DRCpub](E[KSC_i pub](Usr_A pri_i))$ by means of the secret key $KSC_i pri$ of the key storage apparatus and transmits it to the key recovery apparatus DRC.

(9) The key recovery apparatus DRC decrypts the received $D[KSC_i pri](E[DRCpub](E[KSC_i pub](Usr_A pri_i)))$ by means of the secret key DRCpri of the key storage apparatus to recover the split secret key $Usr_A pri$ of the user A on the assumption that any cryptograph algorithm capable of calculating $$D[KSC_i pri](E[DRCpub](E[KSC_i pub](Usr_A pri_i)))=E[DRCpub](D[KSC_i pri](E[KSC_i pub](Usr_A pri_i)))=E[DRCpub](Usr_A pri_i)$$

is utilized.

(10) The key recovery apparatus DRC repeats the above steps (7) to (9) for the secret key $Usr_A pri$ of the user A between the key recovery apparatus and the key storage apparatuses $KSC_i$ a number of times equal to the split number n.

(11) The key recovery apparatus DRC combines n split secret keys $Usr_A pri_i$ to reconstruct the user's secret key $Usr_A pri$.

The above-described conventional encrypted data recovery method has the following problems:

(1) There is the possibility that the restored secret key will leak to an illegal person during reconstruction of a lost secret key in the key recovery apparatus. There is the possibility that unlimited secret information may be recovered without recognition of the user.

(2) There is a case where the key storage apparatus uses user's information (user's name, post, authentication information and the like) as one of measures for managing the plurality of split secret keys. In this case, there is the possibility that an illegal person intruding into a certain key storage apparatus can conjecture the position of another split secret key on the basis of a split secret key and the user's information. There is the possibility that the secret key may be discovered by the illegal person without recognition of the user.

SUMMARY OF THE INVENTION

It is an object to provide a system including management means that take the place of user's information in regard to split secret keys in a key storage apparatus and which does not require storage of the user's information in the key storage apparatus.

In order to achieve the above object, according to the present invention, the following system is provided.

In a key registration apparatus and a data recovery apparatus, as measures for preventing unlimited recovery of a secret using a reconstructed secret key, only a common key contained in enveloped data is adapted to be recovered without reconstruction of the secret key.

As measures for preventing conjecture of the user's secret key using user's information in the key storage apparatus, the user's information is adapted not to be stored in the key storage apparatus, and there are provided an identifier for key registration for relating the key registration apparatus to split secret keys of the key storage apparatuses, an identifier for key recovery for relating a data recovery apparatus to the split secret keys of the key storage apparatuses, and the same hash function for relating the identifier for key registration and an identifier for key storage to the same split secret keys.

More particularly, (1) as measures for preventing occurrence of unlimited secret recovery using the reconstructed secret key, the present invention provides an encrypted data recovery method comprising a step (data key recovery response) of partially recovering the data key encrypted by the public key in the enveloped data in each key storage apparatus by means of the split secret key of the key storage apparatus, and a step (data key recovery request) of combining a plurality of partially recovered data keys prepared for each key storage apparatus and decrypting the data key in the key recovery apparatus.

Particularly, in a preferred procedure of the present invention, the data key recovery response and the data key recovery request procedures in the encrypted data recovery method are realized using blind decryption.

A system of the present invention comprises a key storage apparatus including a data recovery server 690 unit for decrypting the encrypted data key received from a data recovery client 660 unit by means of split secret keys kept in custody and a key recovery apparatus including a data recovery client 660 unit for transmitting the encrypted data key extracted from the enveloped data to a plurality of data recovery server 690 units and combining partially recovered data keys received from a plurality of data recovery servers 690 unit therewith to construct the data key.

(2) As measures for preventing conjecture of the user's secret key using the user's information in the key storage apparatus, the present invention provides an encrypted data recovery method comprising a step of preparing a key escrowed identifier by means of a random number in key registration response in case of backup of key, a step of calculating a storage key identifier by means of the key escrowed identifier and an identifier of the key storage apparatus in a key storage request, a step of keeping split secret keys in the key storage apparatuses in relation to the storage key identifier in key storage response, and a step of sending the key escrowed identifier to the user security apparatus in key registration response, a step of calculating the storage key identifier by means of the key escrowed identifier sent to the user security apparatus and the identifier of the key storage apparatus in data recovery request in case of recovery of the key, and a step of searching for the split secret key kept in the key storage apparatus in custody by means of the calculated storage key identifier in data key recovery response.

Further, in a preferred procedure of the present invention, encrypted data recovery method is described in which the step of sending the key escrowed identifier to the user security apparatus in the key registration response includes a step of issuing a public key certificate containing the key escrowed identifier.

Furthermore, in another preferred procedure of the present invention, there is provided the encrypted data recovery method in which the step of sending a first identifier to the user security apparatus in the key registration response includes a step of outputting at least one or more key escrowed identifiers to be stored, to a portable medium in relation to an output time of the identifier or information related to the split secret key.

A system of the present invention comprises a key storage apparatus including a key registration server 640 unit for preparing a key escrowed identifier and notifying upon receipt of the secret key the key registration client 610 unit and a key storage client unit for preparing the storage key identifier from the key escrowed identifier and a key storage apparatus identifier 626, a key storage apparatus including a key storage server 670 unit for keeping the storage key identifier and the split secret key in relation to each other in custody and the data recovery server 690 unit using the split secret key related to the storage key identifier to decrypt the data key encrypted by the public key to prepare the partially recovered data key, and a key recovery apparatus including the data recovery client 660 unit for calculating the storage key identifier from the key escrowed identifier and the key storage apparatus identifier 626.

As described above, the encrypted data recovery method and system according to the present invention have the following features:

(1) There is provided the key registration apparatus which intermediates between the user security apparatus and the key storage apparatus.

(2) Only the data key is decrypted without reconstruction of split secret keys of the key storage apparatuses.

The key recovery system having such features possesses the following advantages:

(1) The convenience of the key escrowed operation is increased by intermediation of the reliable key registration apparatus.

(2) Information relative to the user's secret key does not leak in the key recovery system.

BRIEF DESCRIPTION OF THE DRAWINGS

FIG. 3 is a flow chart explaining a preparation procedure and a utilization procedure of a storage key identifier in key registration;

FIGS. 6A and 6B are block diagrams schematically illustrating an encrypted data recovery system of the present invention;

FIG. 8 is a diagram explaining a relation of the present invention and a conventional cryptograph algorithm.

DESCRIPTION OF THE PREFERRED EMBODIMENTS

Referring now to FIG. 8, an encrypted data recovery method of the present invention is described.

An encrypted data recovery system of the present invention includes a user security apparatus, a key registration apparatus, a key storage apparatus and a data recovery apparatus.

In step 801, a pair including public key a $Usr_Apub$ and secret key $Usr_Apri$ of a user A is prepared in the user security apparatus.

In step 802, the secret key $Usr_Apri$ is backed up by the user A by using the user security apparatus, the key registration apparatus and the key storage apparatus and the user A receives a receipt in exchange therefor. Detailed procedure thereof is described later in steps 101 to 105 of FIG. 1.

In step 803, a message m is encrypted in the enveloped data format by means of a common key S and the public key $Usr_Apub$ of the user A in the user security apparatus.

In step 804, the user A loses the secret key $Usr_Apri$ accidentally.

In step 805, the message m is recovered by the user A by means of a data recovery apparatus, the key registration apparatus and the key storage apparatus. The present invention is characterized by the enveloped data and inputting of the receipt in step 802. Detailed procedure thereof is described later in step 201 to 205 of FIG. 2.

Contents of steps 801 and 803 are conventional procedures in cryptograph systems. When the secret key is lost in step 804 and it is understood that the enveloped data of step 803 cannot be decrypted, a countermeasure procedure by the user is made in step 805 and a defensive procedure is made in step 802. Further, it is a matter of course that steps 802 and 803 may be exchanged with each other in accordance with the practical use of the cryptograph system.

The encrypted data recovery method and the system for realizing the method of the present invention are now described in relation to steps 802 and 805.

An embodiment of the present invention in which the data key is combined without reconstruction of the secret key is described in detail with reference to FIGS. 6A and 6B.

Apparatuses constituting the encrypted data recovery system and programs including sub-programs operated in the apparatuses, that is, (1) a computer apparatus of the encrypted data recovery system, (2) an application program (AP) for performing a registration operation of the secret key and a recovery operation of data, and (3) a sub-program (key recovery library) called by the AP to perform a key recovery function are described with reference to FIGS. 6A and 6B.

(1) Apparatuses of Encrypted Data Recovery System

Figure 6A:
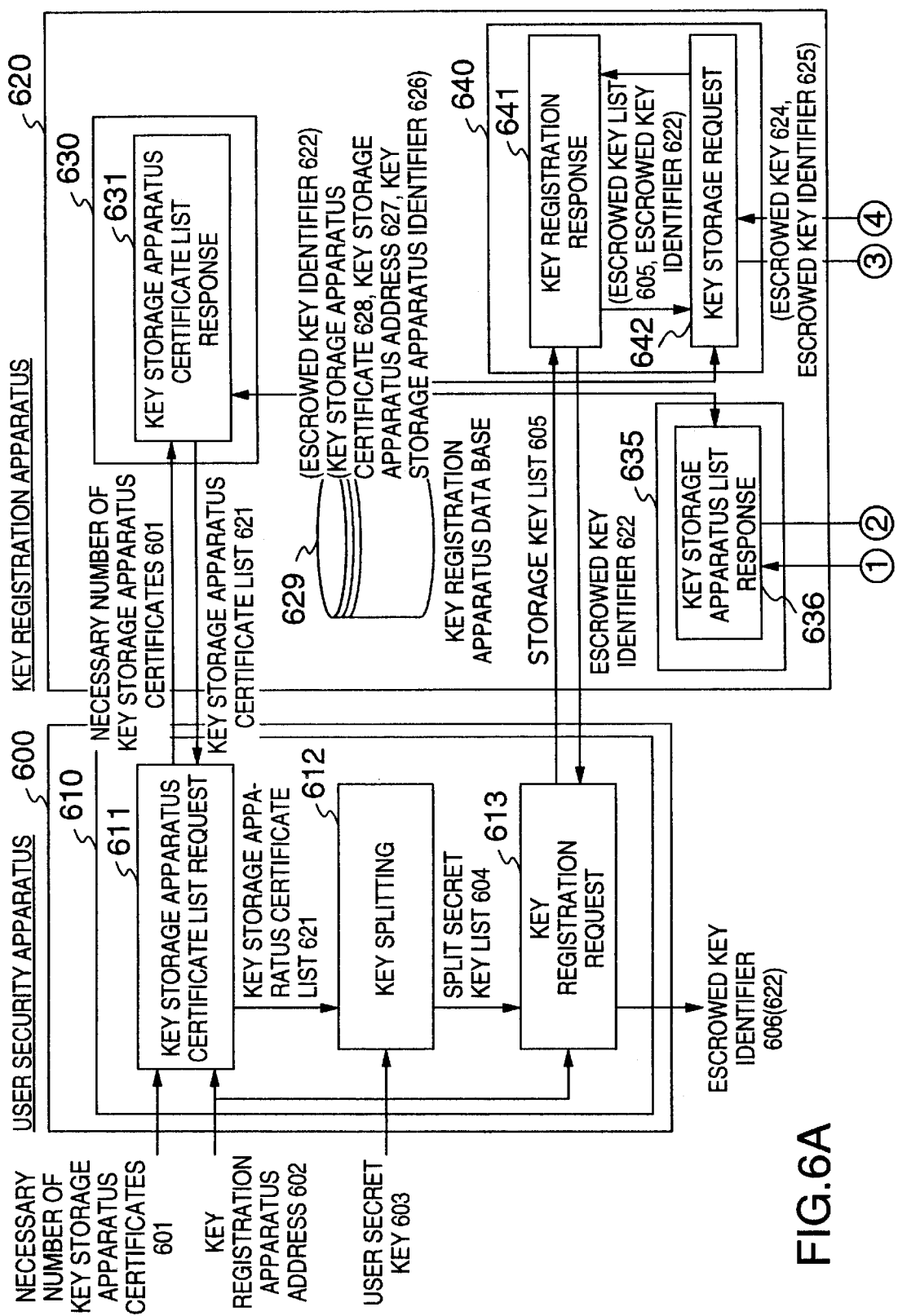

The encrypted data recovery system of the present invention includes a user security apparatus 600, a key registration apparatus 620, a key storage apparatus 670 and a data recovery apparatus 650 as shown in FIGS. 6A and 6B.

The role of the user security apparatus 600 is to split the secret key of the user and request the key registration apparatus to register the split secret keys. Further, the role of the user security apparatus is to provide notification of a key escrow identifier constituting response information to the registration request to the user.

The role of the key registration apparatus 620 is to request the key storage apparatus to keep the split secret key corresponding to the registration request from the user security apparatus in custody and further manage a certificate and the like of the key storage apparatus.

The role of the key storage apparatus 670 is to receive the storage request from the key storage apparatus and keep the split secret key in custody. Further, the role of the key storage apparatus is to receive a decryption request from the data recovery apparatus 650 and decrypt the encrypted data key of the enveloped data by means of the split secret key.

The role of the data recovery apparatus 650 is to request the key storage apparatus to decrypt the encrypted data key of the enveloped data. Further, the role of the data recovery apparatus is to restore the data key from response information to the decryption request and decrypt the encrypted message of the enveloped data by using the decrypted data key, thereby providing the message to the user.

(2) Configuration of Application Program

A key recovery application program (hereinafter referred to as application) performs a registration operation of the secret key and a recovery operation of data. The key recovery application can be classified into a client application (hereinafter referred to as client) which receives an input from the user and calls a key recovery library function to be operated and a server application (server) which calls the key recovery library function and waits for a request from the client to be operated.

Applications operated in the computer apparatus described in (1) are now enumerated.

(a) Key Registration Client 610: User Security Apparatus 600

This is a program for splitting the user's secret key and registering the split secret keys using the key registration apparatus when the user registers the user's own secret key. A key storage apparatus certificate list request function 611, a key splitting function 612, and a key registration request function 613 are called.

(b) Key Storage Apparatus Certificate Notification Server 630: Key Registration Apparatus 620

This is a program for taking out certificates of a required number of key storage apparatuses required by the key registration client 610 (key storage apparatus certificate notification client) from a key registration apparatus data base. A key storage apparatus certificate list response function 631 is called.

(c) Key Registration Server 640: Key Registration Apparatus 620

This is a program for transmitting the split secret keys received from the key registration client 610 to the key storage server 670 and for providing notification of a receipt (key escrow identifier) to the key registration client 610. A key registration response function 641 and a key storage request function 642 are called.

(d) Key Storage Server 670: Key Storage Apparatus 670

This is a program for receiving the split secret keys from the key registration server 640 (key storage client) and keeping the received split secret keys in the key storage apparatus data base in custody. A key storage response function 681 is called.

(e) Data Recovery Client 660: Data Recovery Apparatus 650

This is a program for taking out the encrypted data key from the enveloped data to send it to all data recovery servers 690 and combining the data key from the received partial recovery data to recover the enveloped data. A key storage apparatus information list request function 661, a data key recovery request function 662 and a message recovery function 663 are called.

(f) Key Storage Apparatus Information Notifying Server 635: Key Registration Apparatus 620

This is a program for providing notification of information (key storage apparatus certificate, key storage apparatus address, key storage apparatus identifier) relative to the key storage apparatus to the data recovery client 660. A key storage apparatus information list response function 636 is called.

(g) Data Recovery Server 690: Key storage apparatus 670

This is a program for receiving the encrypted data key from the data recovery client 660 and decrypting the encrypted data key by means of a kept split secret key. A data key recovery response function 691 is called.

Data structures utilized by applications in the computer apparatus described in (1) are now enumerated.

(a) Key Registration Apparatus Data Base 629

This data base is provided in the key registration apparatus and manages items including an escrowed key identifier 622, a key storage apparatus certificate, a key storage apparatus address and a key storage apparatus identifier 626, which are the original copies for preparing the escrowed key identifier 622, a key storage apparatus certificate list 621 and a key storage apparatus information list 623. For simplification of description, one data base is used, while a plurality of data bases may be used in accordance with utilization objects.

(b) Key Storage Apparatus Data Base

This data base is provided in the key storage apparatus and manages items including storage keys 624 and storage key identifiers 625. The data base is characterized in that the storage key can be accessed while the storage key identifier is used as a retrieval condition.

(3) Structure of Sub-Programs of Encrypted Data Recovery System

The sub-program is a library of functional units which is called by an application to perform the key recovery function. Description thereof is made for key registration and data recovery separately.

LIST OF FUNCTIONS USED IN KEY REGISTRATION (1) Key Storage Apparatus Certificate List Request Function 611

A necessary number of key storage apparatus certificates, an address of the key registration apparatus and a public key of a certification authority are input.

A list of certificates of the key storage apparatuses is requested by the key storage apparatus certificate list response function.

The key storage apparatus certificate in the certificate list of the key storage apparatus is verified by means of the public key of the certification authority.

Certificates of the necessary number and the storage key identifier which are responses to the list request are output as the key storage apparatus certificate list.

(2) Key Storage Apparatus Certificate List Response Function 631

Waits for the key storage apparatus certificate list request.

The key registration apparatus data base is accessed and the key storage apparatus certificate list (the necessary number of certificates of the key storage apparatus and the key storage apparatus identifier) is produced.

The key storage apparatus certificate list is produced in response to the key storage apparatus certificate list request.

(3) Key Splitting Function 612

The user's secret key and the key storage apparatus certificate list are input.

A split secret key list (the user's secret key is divided by the number of certificates in the key storage apparatus certificate list) is produced.

(4) Key Registration Request Function 613

The split secret key list, the key storage apparatus certificate list and the user's secret key are input.

The public key of the key storage apparatus in the key storage apparatus certificate list is used to encrypt the split secret key in the split secret key list.

The split secret key encrypted by means of the public key of the key storage apparatus and the storage key identifier are combined to produce a storage key list.

Registration of the storage key list is provided by the key registration response.

The escrowed key information which is a response to the registration request is output.

(5) Key Registration Response Function 641

Waits for the key registration request.

The escrowed key identifier is produced and the escrowed key identifier is written in the key registration apparatus data base.

The escrowed key identifier is produced in response to the key registration request.

The key registration request information (storage key list and escrowed key identifier) is produced.

(6) Key Storage Request Function 642

The key registration request information (storage key list and escrowed key identifier) is input.

The storage key list and the escrowed key identifier in the key registration request information are taken out.

The key registration apparatus data base is accessed to retrieve the key storage apparatus address and the key storage apparatus identifier.

The storage key identifier is produced from the escrowed key identifier and the key storage apparatus identifier.

Storage of the key storage request information (storage key and storage key identifier) is provided by the key storage response.

A storage result which is a response to the storage request is stored in the key registration apparatus data base.

(7) Key Storage Response Function 641

Waits for the key storage request.

The storage key identifier and the storage key are retrieved from the key storage request information to be written in the key storage apparatus data base (stored in the state encrypted by the public key of the key storage apparatus).

A storage result notification is provided to the key storage request.

LIST OF FUNCTIONS USED IN DATA RECOVERY (8) Key Storage Apparatus Information List Request Function 661

An address of the key registration apparatus and the public key of the certification authority are input.

A list of the key storage apparatus information is required.

The key storage apparatus certificate in the key storage apparatus information list is verified by means the public key of the certification authority.

The key storage apparatus information list which is a response to the list request is produced.

(9) Key Storage Apparatus Information List Response Function 636

Waits for the key storage apparatus list request.

The key storage apparatus data base is accessed to retrieve the key storage apparatus address and the key storage apparatus identifier.

The key storage apparatus data base is accessed to retrieve the certificate of the key storage apparatus.

The key storage apparatus information list is produced from the key storage apparatus address, the key storage apparatus identifier and the certificate of the key storage apparatus.

The key storage apparatus information list is produced in response to the key storage apparatus information list request.

(10) Data Key Recovery Requiring Function 662

The escrowed key identifier, the enveloped data and the key storage apparatus information list are input.

Decryption of the encrypted data key in the enveloped data is provided by each key storage apparatus.

The split number of partially recovered data keys which are responses to the data key decryption request are combined to restore the data key.

(11) Data Key Recovery Response Function 691

Waits for the data key decryption request.

The data key decryption request (encrypted data key and storage key identifier) is used to search for the split secret keys stored in the key store apparatus data base.

The secret key of the key storage apparatus is used to decrypt the searched split secret keys.

The decrypted split secret keys are used to decrypt the data key of the data key decryption request. This decrypted data key is named a partially recovered data key.

The partially recovered data key is produced in response to the data key decryption request.

(12) Message Recovery Function 663

The enveloped data and the restored data key are input.

The restored data key is used to decrypt the encrypted message in the enveloped data.

Figure 1:
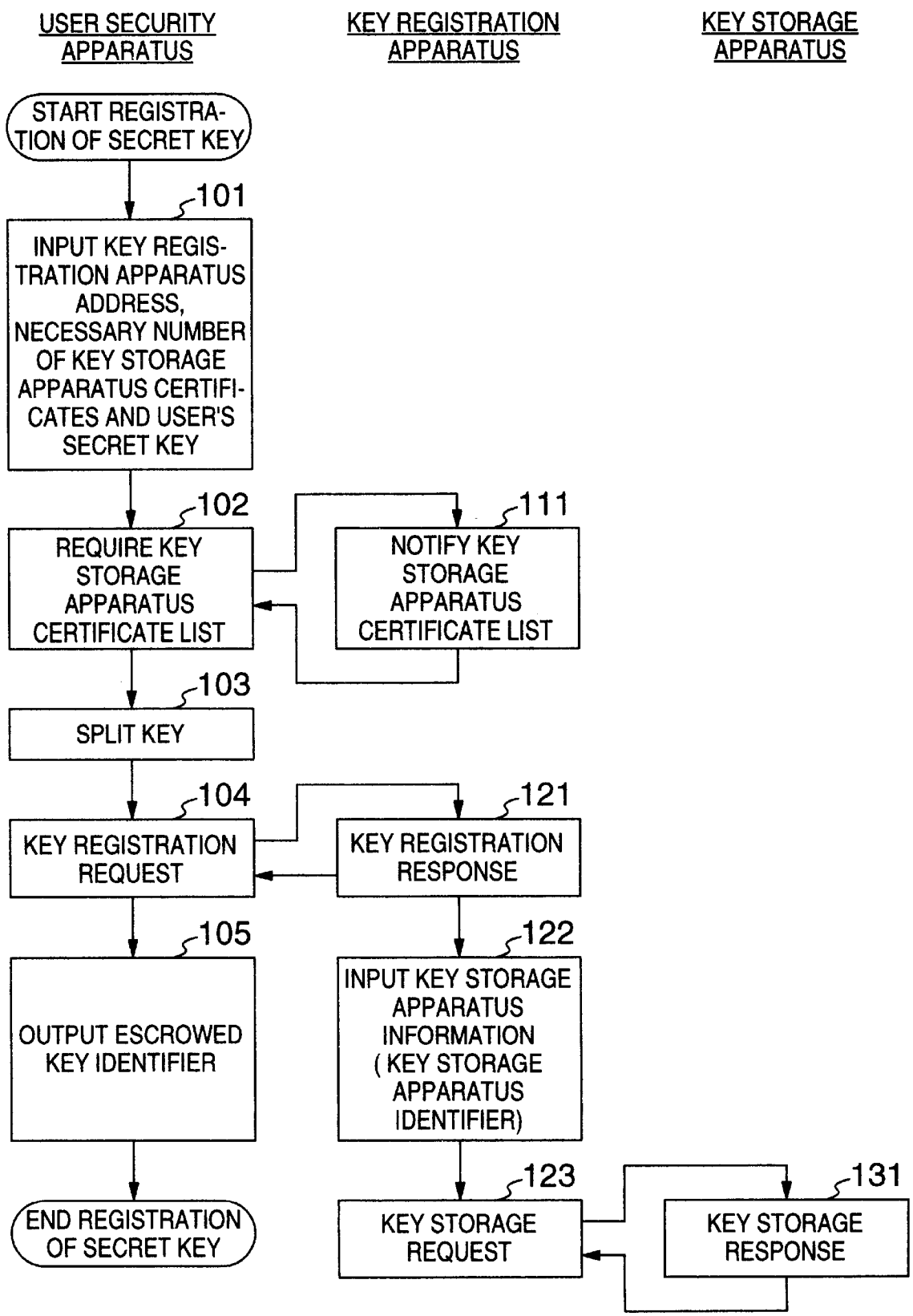
FIG. 1 is a flow chart explaining the procedure whereby split secret keys encrypted by means of a public key of a key storage apparatus are delivered from a user security apparatus through a key registration apparatus to each key storage apparatus.
Figure 2:
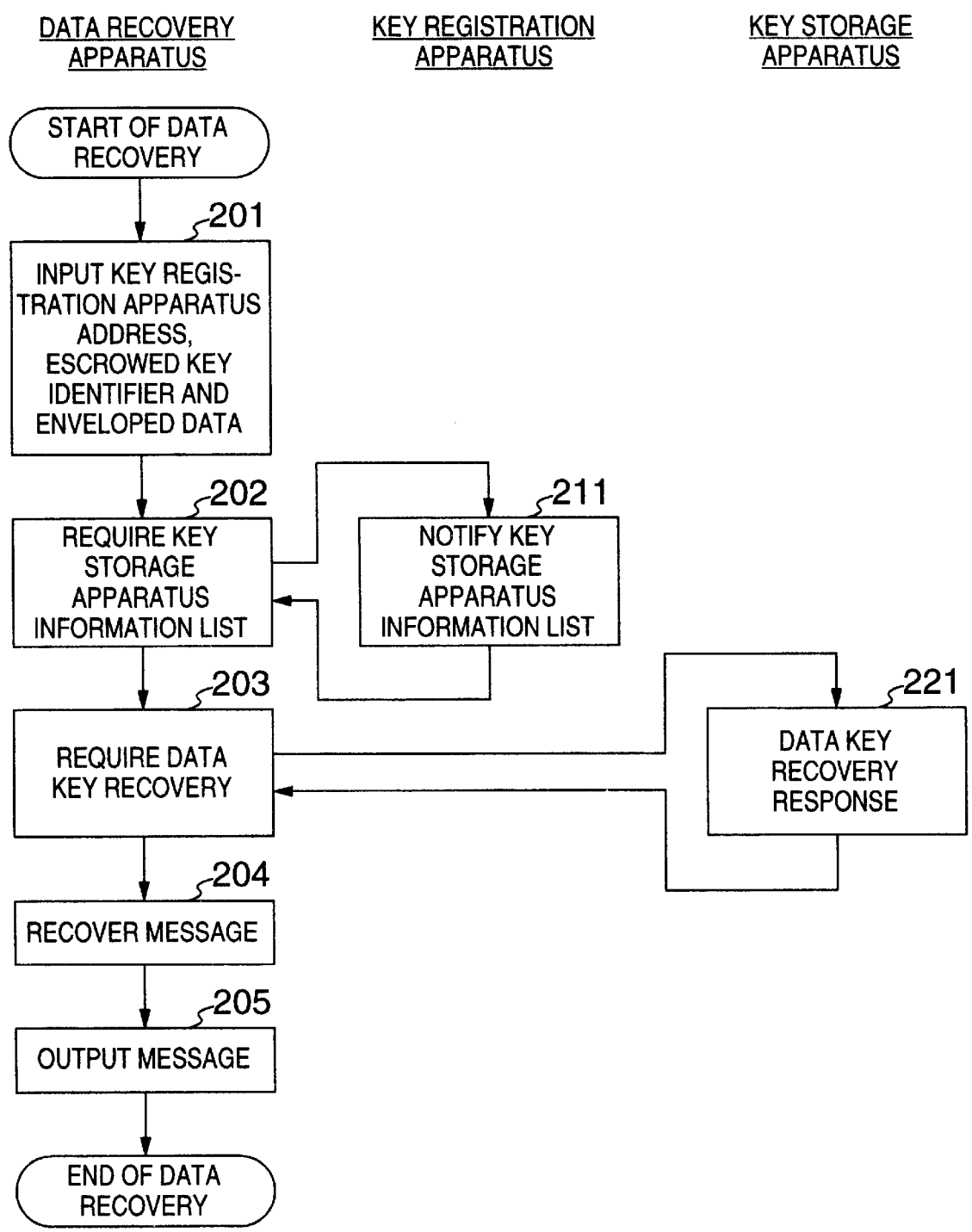
FIG. 2 is a flow chart explaining a data recovery procedure of the present invention in which partially recovered data keys are combined in communication between the data recovery apparatus and the key storage apparatus and split secret keys are not reconstructed in the data recovery apparatus.
Figure 4:
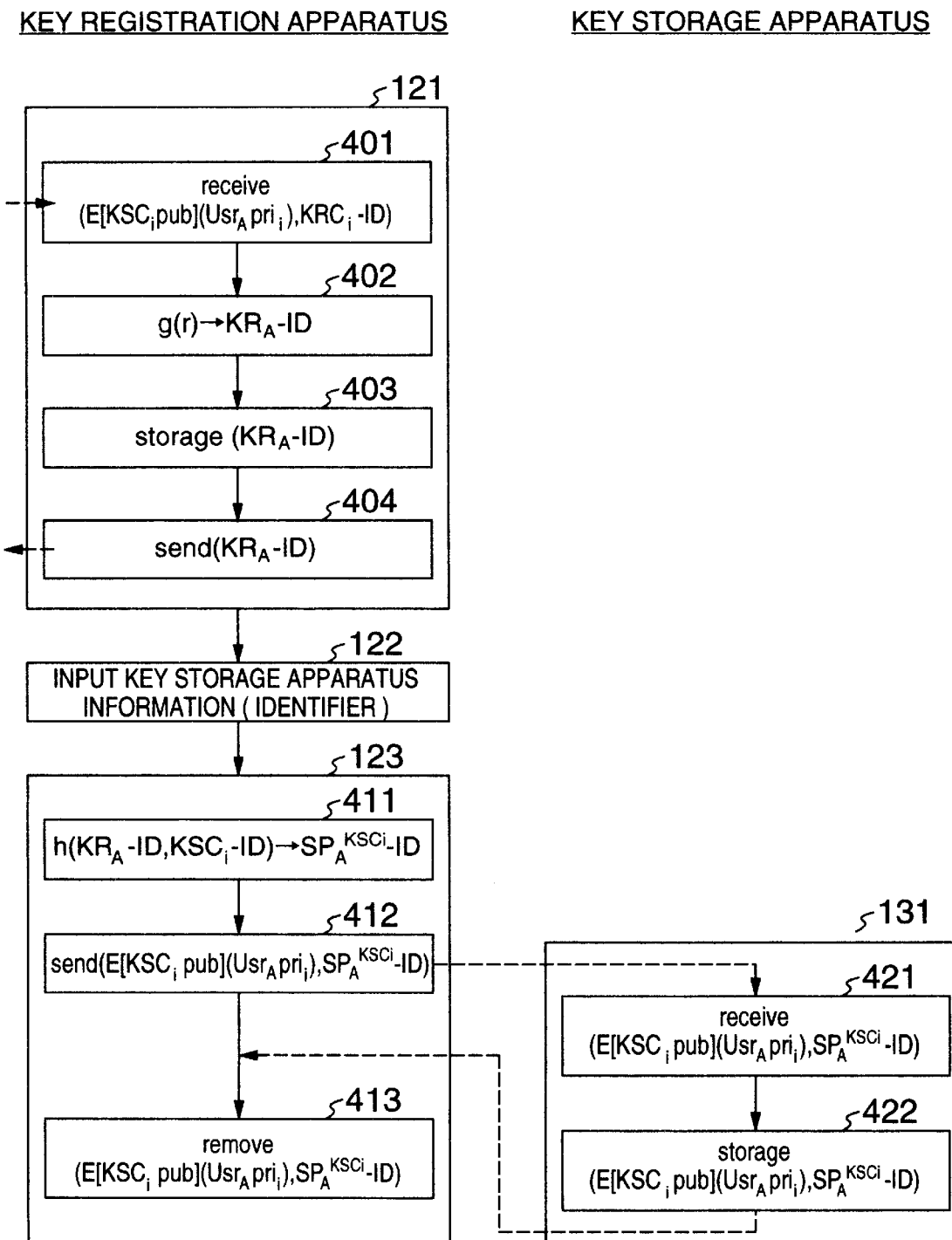
FIG. 4 is a flow chart explaining a preparation procedure and a utilization procedure of a storage key identifier in key registration.

Next, the key registration procedure shown in FIGS. 1 and 4 and the data recovery procedure shown in FIGS. 2 and 3 in the computer illustrated in FIGS. 6A and 6B are described.

Referring now to FIGS. 1 and 4, the key registration procedure is described.

The key registration procedure (FIG. 1) of the present invention is characterized by processing contents of steps 121 and 131. FIG. 4 shows processing contents of step 121 for registration of the split secret key and steps 123 and 131 for delivery of the storage key 624 of the split secret key in FIG. 1 in detail.

Step 101: Input the key registration apparatus address, the necessary number of key storage apparatus certificates and the user's secret key.

(1) The key registration apparatus address, the necessary number n of key storage apparatus certificates (=the split number k of the secret key) and the user's secret key $Usr_A pri$ are input to the key registration client 610 of the user security apparatus.

Step 102: Require the key storage apparatus certificate list.

(1) The key registration client 610 of the user security apparatus transmits the necessary number k of key storage apparatus certificates to the key storage apparatus certificate notifying server 630 of the key registration apparatus and requests the key storage apparatus certificate list.

(2) The key registration client 610 waits for a response from the key storage apparatus certificate notifying server 630.

(3) The key registration client 610 receives the key storage apparatus certificate list returned from the key storage apparatus certificate notifying server 630.

Step 111: Providing notification of the key storage apparatus certificate list.

(1) The key storage apparatus certificate list notifying server 630 of the key registration apparatus waits for the key storage apparatus certificate list notification request.

(2) The key storage apparatus certificate list notifying server 630 takes out a combination of the key storage apparatus certificate and the key storage apparatus identifier from the key registration data base by the necessary number k of key storage apparatus certificates and prepares the key storage apparatus certificate list.

(3) The key storage apparatus certificate list notifying server 630 transmits the key storage apparatus certificate list to the key registration client 610.

Step 103: splitting of key.

(1) The key registration client 610 inputs the user's secret key and the key storage apparatus certificate list.

(2) The key registration client 610 splits the user's secret key by the number of certificates in the key storage apparatus certificate list and prepares the split secret key list.

Step 104: Key registration request (1) The key registration client 610 encrypts the split secret keys in the split secret key list by means of the public key of the key storage apparatus in the key storage apparatus certificate list.

(2) The key registration client 610 combines the split secret key encrypted by means of the public key of the key storage apparatus with the storage key identifier and prepares the storage key list.

(3) The key registration client 610 requests registration of the storage key list from the key registration response.

(4) The key registration client 610 produces the escrowed key identifier which is a response to the registration request.

Step 121: Key registration response (1) The key registration server 640 of the key registration apparatus waits for the key registration request.

(2) The key registration server 640 receives the key registration request (the storage key list $E[KSC_i pub]$ $(Usr_A pri_i)$ and the storage key apparatus identifier $KSC_i\text{-ID}$) (step 401).

(3) The key registration server 640 uses a random number to prepare the escrowed key identifier $KR_A\text{-ID}$ (step 402).

(4) The key registration server 640 writes the escrowed key identifier $KR_A\text{-ID}$ into the key registration apparatus data base (step 403).

(5) The key registration server 640 transmits the escrowed key identifier $KR_A$-ID to the key registration client 610.

Step 122: Input the key storage apparatus information (key storage apparatus identifier 626).

(1) The key registration server 640 of the key registration apparatus retrieves the key storage apparatus identifier from the storage key list obtained in step 121.

(2) The key registration server 640 accesses the key registration apparatus data base to retrieve the key storage apparatus identifier.

(3) The key registration server 640 verifies that the key storage apparatus identifiers taken out in (1) and (2) are coincident with each other.

Step 123: Key storage request (1) The key registration server 640 of the key registration apparatus prepares a storage key identifier $SP_A^{KRCi}$-ID from the escrowed key identifier $KR_A$-ID of step 121 and the key storage apparatus identifier $KRC_i$-ID of step 122 (step 411).

(2) The key registration server 640 transmits the storage key $E[KSC_ipub](Usr_Apri_i)$ and the storage key identifier $SP_A^{KRCi}$-ID to the key storage server 670 of the key storage apparatus and requests storage of key (step 412).

(3) The key registration server 640 waits for a response from the key storage server 670 of each key storage apparatus.

(4) The key registration server 640 confirms preservation of the storage key 624 of each key storage apparatus on the basis of a return result of (3) and deletes the storage key $E[KSC_ipub](Usr_Apri_i)$ and the storage key identifier $SP_A^{KRCi}$-ID (step 413).

(5) The key registration server 640 repeats the above procedures (1) to (4) a number of times equal to the split number k of the secret key.

Step 131: Key storage response (1) The key storage server 670 of the key storage apparatus $KSC_i$ receives the storage key $E[KSC_ipub](Usr_Apri_i)$ and the storage key identifier $SP_A^{KRCi}$-ID.

(2) The key storage server 670 of the key storage apparatus $KSC_i$ relates the storage key $E[KSC_ipub](Usr_Apri_i)$ to the storage key identifier $SP_A^{KRCi}$-ID to be preserved.

Step 105: Output the escrowed key identifier 606.

(1) The key registration client 610 of the user security apparatus outputs the escrowed key identifier obtained in step 104 onto a picture screen of the user security apparatus.

(2) The key registration client 610 preserves the escrowed key identifier in the user security apparatus or a portable medium in accordance with a user's approval response to the output to the picture screen of (1).

In the above description, the process proceeds to step 105 next to step 121 and the key registration processing is finished without waiting for the key storage processing in the key storage apparatus. Separately, steps 122, 123 and 131 are processed as batch processing. However, it is needless to say that processing until step 131 may be executed and the process may proceed to step 105 after the key storage in the key storage apparatus is confirmed.

Referring now to FIGS. 2 and 3, the data recovery procedure of the present invention is described.

The data recovery procedure (FIG. 2) of the present invention is characterized by processing contents of steps 203 and 221. FIG. 3 shows step 203 in which encrypted data key is transmitted and step 221 in which data key is recovered partially in detail.

Step 201: input the key registration apparatus address, the escrowed key identifier and the enveloped data (1) The key registration apparatus address, the escrowed key identifier and the enveloped data are input to the data recovery client 660.

Step 202: request the key storage apparatus information list 623

(1) The data recovery client 660 requests a list of the key storage apparatus information (the key storage apparatus address and the key storage apparatus identifier) from the key storage apparatus information notifying server 635 of the key storage apparatus.

(2) The data recovery client 660 waits for a response of the key storage apparatus information notifying server 635.

(3) The data recovery client 660 obtains the key storage apparatus information list returned from the key storage apparatus information notifying server 635.

Step 211: notify the key storage apparatus information list (1) The key storage apparatus information notifying server 635 of the key registration apparatus accesses the key registration apparatus data base to retrieve all of available key storage apparatus information and prepares the key storage apparatus information list.

(2) The key storage apparatus information notifying server 635 notifies the key storage apparatus information list to the data recovery client 660.

Step 203: request the data key recovery.

(1) The data recovery client 660 extracts $E[Usr_Apub](S)$ in the enveloped data 653 (step 301).

(2) The data recovery client 660 calculates the storage key identifier from the escrowed key identifier $KR_A$-ID of step 201 and the key storage apparatus identifier $KSC_j$-ID of step 202 (step 302).

(3) The data recovery client 660 transmits the encrypted data key $E[Usr_Apub](S)$ and the storage key identifier to the data recovery server 690 of the key storage apparatus $KSC_i$ and requests the data recovery server 690 to decrypt the data key (step 303).

(4) The data recovery client 660 waits for a response from the data recovery server 690.

(5) The data recovery client 660 repeats the above procedures (2) to (4) a number of times equal to the number n of the key storage apparatuses.

(6) The data recovery client 660 obtains $D[Usr_Apri_i](E[Usr_Apub](S)) = S_i$ returned by the data recovery server 690 of the key storage apparatus $KSC_i$ (step 304).

(7) The data recovery client 660 uses a necessary number k of data keys to combine $S_i$ (i=1, ..., k) and reconstructs the data key S.

Step 221: data key recovery response (1) The data recovery server 690 of the key storage apparatus $KSC_i$ receives the encrypted data key $E[Usr_Apub](S)$ and the storage key identifier $SP_A^{KRCi}$-ID (step 311).

(2) The data recovery server 690 accesses to the key storage apparatus data base and searches for the storage key $E[KSC_ipub](Usr_Apri_i)$ on the condition of the storage key identifier $SP_A^{KRCi}$-ID of (1) (step 312).

(3) The data recovery server 690 decrypts the storage key $E[KSC_ipub](Usr_Apri_i)$ by means of the public key $KSC_ipri$ of the key storage apparatus $KSC_i$ (step 313).

(4) The data recovery server 690 decrypts $E[Usr_Apub](S)$ by means of the split secret key $Usr_Apri_i$ (step 314).

(5) The data recovery server 690 returns partially recovered data key $D[Usr_Apri_i](E[Usr_Apub](S)) = S_i$ to the data recovery client 660 (step 315).

(6) The data recovery server 690 re-encrypts the split secret key Usr$_A$pri$_i$ by means of the public key KSC$_i$pub of the key storage apparatus KSC$_i$.

Step 204: Recover message.

(1) The data recovery client 660 extracts the ciphertext E(S)(m) in the enveloped data.

(2) The data recovery client 660 decrypts the ciphertext E[S](m) by means of the data key S.

Step 205: Output message.

(1) The data recovery client 660 outputs a plaintext m.

In the above description, the data recovery client 660 of the data recovery apparatus and the data recovery server 690 of each key storage apparatus are operated in parallel, while they may be operated a sequential manner.

In the above description, the split number k of the secret key is equal to the number n of the key storage apparatuses, that is, the secret key is split so that split secret keys are stored in all of the key storage apparatuses. Next, processing in those cases where both of the numbers are not coincident with each other is described.

In those cases where the number n of the key storage apparatuses is larger than the split number k of the secret keys (n>k):

In step 221, the data recovery server 690 of the key storage apparatus which does not keep the split secret key in custody is unsuccessful in retrieving the split secret key Usr$_A$pri$_i$ using the storage key identifier. The data recovery server 690 returns "an empty key" to the data recovery client 660. The failure in the retrieval is caused by use of a unique storage key identifier produced from a unique escrowed key identifier and a unique key storage apparatus identifier.

In step 203, the data recovery client 660 of the data recovery apparatus combines the data key by using partially recovered data keys except the "empty key".

In case where the number n of the key storage apparatuses is smaller than the split number k of the secret keys (n<k):

In step 203, the data recovery client 660 of the data recovery apparatus cannot get n data keys partially recovered and is unsuccessful in reconstruction of the data key, so that processing is finished unusually. It is needless to say that the SS technique based on the threshold method described in the prior art is used to split the key and the data key may be reconstructed with the number n of the key storage apparatuses.

Embodiment to which Blind Decryption is Applied

In another embodiment of the present invention, blind decryption described in the prior art is applied in steps 203 and 204 described above.

In a known example, blind decryption is applied in order to conceal the secret key recovered by the key recovery apparatus against each key storage apparatus. On the contrary, in the present invention, blind decryption is applied in order to conceal contents (partially recovered data keys) of data key recovered by the key recovery apparatus against each key storage apparatus.

The procedure of the present invention is now described.

Step 203': this step is different from step 203 in that procedures (2) and (8) are added.

(1) The data recovery client 660 extracts E[Usr$_A$pub](S) from the enveloped data.

(2) The data recovery client 660 encrypts E[Usr$_A$pub](S) by means of the public key DRCpub of the data recovery apparatus.

(3) The data recovery client 660 calculates the just storage key identifier from the escrowed key identifier 652 of step 201 and the key storage apparatus identifier 626 of step 202.

(4) The data recovery client 660 transmits the encrypted data key E[Usr$_A$pub](E[Usr$_A$pub](S)) and the storage key identifier of (3) to the data recovery server 690 of the key storage apparatus KSC$_i$ and requests the data recovery server 690 to decrypt the data key.

(5) The data recovery client 660 waits for a response from the data recovery server 690.

(6) The data recovery client 660 repeats the above procedures (3) to (5) a number of times equal to the number n of the key storage apparatuses.

(7) The data recovery client 660 obtains E[DRCpub](S$_i$) returned by the data recovery server 690 of the key storage apparatus KSC$_i$.

(8) The data recovery client 660 decrypts E[DRCpub](S$_i$) by means of the secret key DRCpri and takes out S$_i$.

(9) The data recovery client 660 uses a necessary number k of data keys to combine S$_i$ (i=1, . . . , k) and reconstructs the data key S.

Step 221': this step is different from step 221 in that contents of S$_i$ are concealed against the key storage apparatus KSC$_i$.

(1) The data recovery server 690 of the key storage apparatus KSC$_i$ receives the encrypted data key E[DRCpub](E[Usr$_A$pub](S)) and the storage key identifier.

(2) The data recovery server 690 accesses to the key storage apparatus data base and searches for the storage key E[KSC$_i$pub](Usr$_A$pri$_i$) on the condition of the storage key identifier of (1).

(3) The data recovery server 690 decrypts the storage E[KSC$_i$pub](Usr$_A$pri$_i$) by means of the secret key KSC$_i$pri of the key storage apparatus KSC$_i$.

(4) The data recovery server 690 decrypts E[DRCpub](E[Usr$_A$pub](S)) by means of the split secret key Usr$_A$pri$_i$. D[Usr$_A$pri$_i$](E[DRCpub](E[Usr$_A$pub](S)))=E[DRCpub](D[Usr$_A$pri$_i$](E[Usr$_A$pub](S)))=E[DRCpub](S$_i$).

(5) The data recovery server 690 returns partially recovered data key E[DRCpub](S$_i$) to the data recovery client 660.

(6) The data recovery server 690 re-encrypts the split secret key Usr$_A$pri$_i$ by means of the secret key KSC$_i$pub of the key storage apparatus KSC$_i$.

Procedure and Apparatus for Preparing the Escrowed Key Identifier and the Storage Key Identifier A preparation procedure, a utilization procedure and a preparation apparatus of the escrowed key identifier and the storage key identifier which are elements for realizing the present invention described above are now described with reference to FIGS. 7, 3 and 4.

Figure 7:
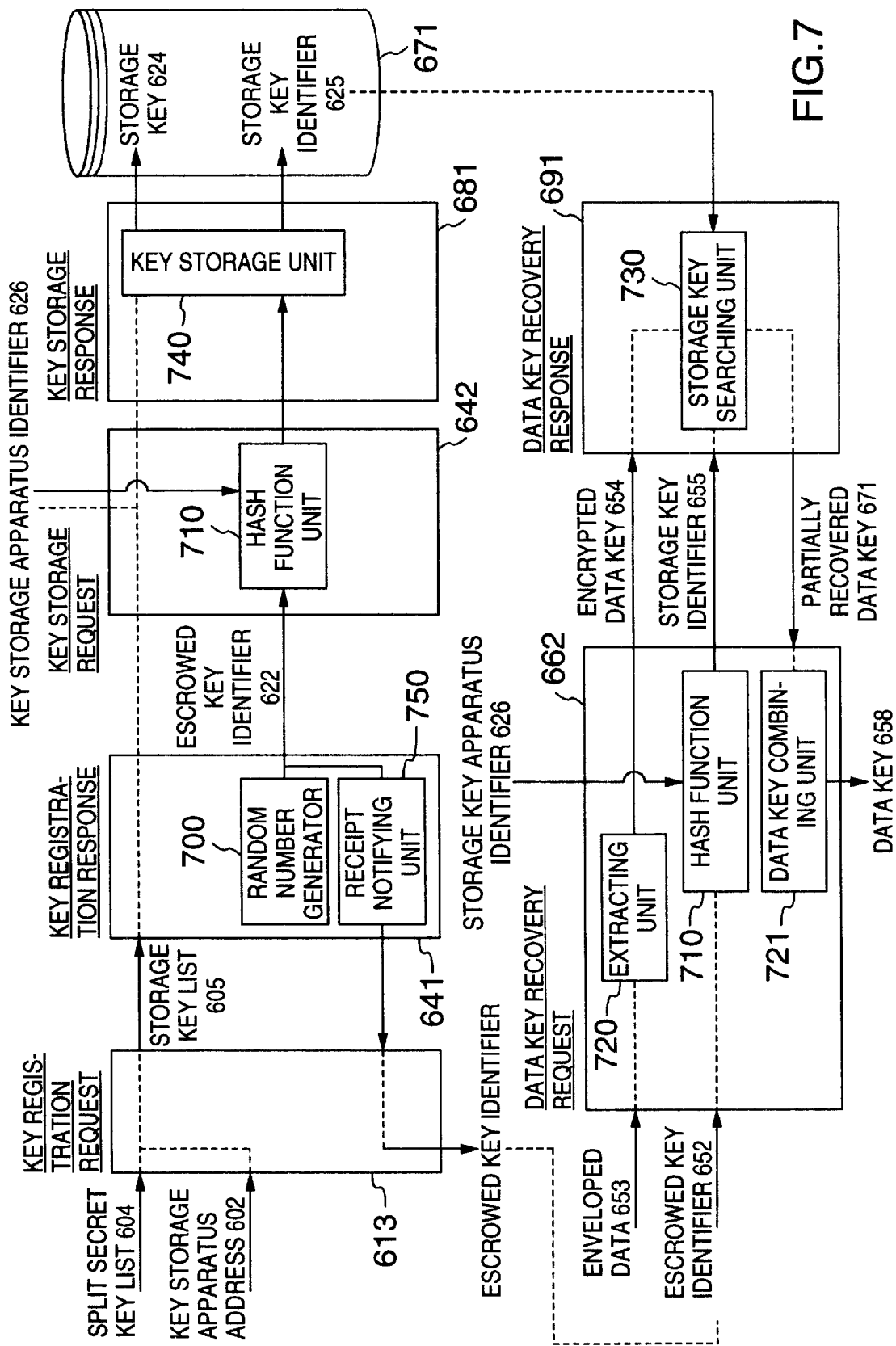
FIG. 7 is a block diagram illustrating the key registration apparatus and the data recovery apparatus including a program for calculating the storage key identifier from the key escrowed identifier.

First, the preparation apparatus of the escrowed key identifier and the storage key identifier is described. Referring to FIG. 7 showing a portion of FIGS. 6A and 6B in detail, a place and function of the preparation apparatus of the escrowed key identifier and the storage key identifier are described.

The key registration response function 641 of the key registration apparatus includes a random number generating unit 700 for generating the escrowed key identifier 622 and a receipt notifying unit 750 for providing notification of the receipt of the secret key to the key registration request function 613 of the user security apparatus.

The key storage requiring function 642 of the key registration apparatus includes a one-way hash function unit 710 supplied with the escrowed key information 622 produced by the random number generating unit 700 and the key storage apparatus identifier 626 and for producing the storage key identifier 625.

The key storage response function 681 of the key storage apparatus includes a key storage unit 740 in which the storage key identifier 625 produced by the hash function unit 710 and the storage key 624 are related and stored.

The data key recovery requiring function 662 of the data recovery apparatus includes an enveloped data extracting unit 720 supplied with the enveloped data 653 and for producing an encrypted data key 654, and a one-way hash function unit 710 supplied with the escrowed key identifier 652 and the key storage apparatus identifier 626 and for producing the storage key identifier 655. Further, the data key recovery request function 662 includes a data key combining unit 721 supplied with a plurality of partially recovered data keys 671 produced by the data key recovery response function 691 and for producing the data key 658.

The data key recovery response function 691 of the key storage apparatus includes a storage key searching unit 730 supplied with the encrypted data key 654 and the storage key identifier 655 produced by the one-way hash function unit 710 and for searching the key storage apparatus data base 671.

The preparation procedure of the escrowed key identifier and the storage key identifier in each preparation apparatus is next described. The random number generating unit 700 is, for example, a pseudo-random bit generator (a function thereof is described as $g(x)$) for generating a stream of random bits. The hash function 710 is a function that produces a different value for inputs x1 and x2 having different values ($h(x1) \neq h(x2)$). In addition, the one-way hash function is a hash function that performs conversion so that an input x cannot be found out from a value of an output $h(x)$.

In the embodiment, the key registration response function 641, the key storage requiring function 622 and the data key recovery response function 662 are realized by software. The random number generating unit 700 and the one-way hash function unit 710 can be also realized easily by calling the function of the software cryptographic library. Accordingly, the random number generating unit 700 is used to call the random number generating function which is a core of the key preparing function of the cryptographic library, for example, so that the escrowed key identifier can be prepared. The one-way hash function 710 is used to call the hash function which is a core of the message digest function, so that the storage key identifier can be prepared.

Finally, the utilization procedure of the escrowed key identifier and the storage key identifier is described.

The data key recovery is based on the double security design principle that when a user is just the user can input the escrowed key identifier 652 equal to an output 606 upon registration of the secret key and when the just key registration apparatus and data recovery apparatus are used the key storage apparatus identifier 626 equal to that upon registration of the secret key can be obtained. The key storage apparatus identifier 626 is utilized on the condition that the pertinent storage key 624 is searched in the key storage apparatus data base by utilizing the properties of the hash.

In FIG. 4, the preparation procedure of the escrowed key identifier 622 (step 402) and the storage key identifier (step 411) in the key registration server 640 of the key registration apparatus and the utilization procedure (step 422) of the storage key identifier in the key storage server 670 of the key storage apparatus are shown.

In FIG. 3, the preparation procedure (step 302) of the storage key identifier in the data recovery client 660 of the data recovery apparatus and the utilization procedure (step 312) of the storage key identifier in the data recovery server 690 of the key storage apparatus are shown.

In step 302, a unique $KR_A$-ID indicating the escrowed key identifier 652 issued upon registration of the secret key $Usr_A$pri of the user A and a unique $KSC_i$-ID indicating the key storage apparatus $KSC_i$ are input and the hash function $h(\ )$ is used to produce a unique key storage apparatus identifier 626 $SP_A{}^{KSCi}$-ID in the key storage apparatus $KSC_i$. In step 312, the key storage apparatus identifier 626 $SP_A{}^{KSCi}$-ID is used to search the split secret key $Usr_A$pri$_i$of the user A in the key storage apparatus data base of the desired key storage apparatus $KSC_i$.

Management Method of the Escrowed Key Identifier:

As described above, in the present invention, since the split secret key received indirectly from the escrowed key identifier can be used to realize the key recovery, management of the escrowed key identifier is important. It is supposed that the user security apparatus has failed, for example, because of loss of the key and as a further embodiment of the present invention the following two kinds of management methods are provided:

(1) The escrowed key identifier is stored as a part of data that is difficult to alter (for example, the public key certificate).

Figure 5:
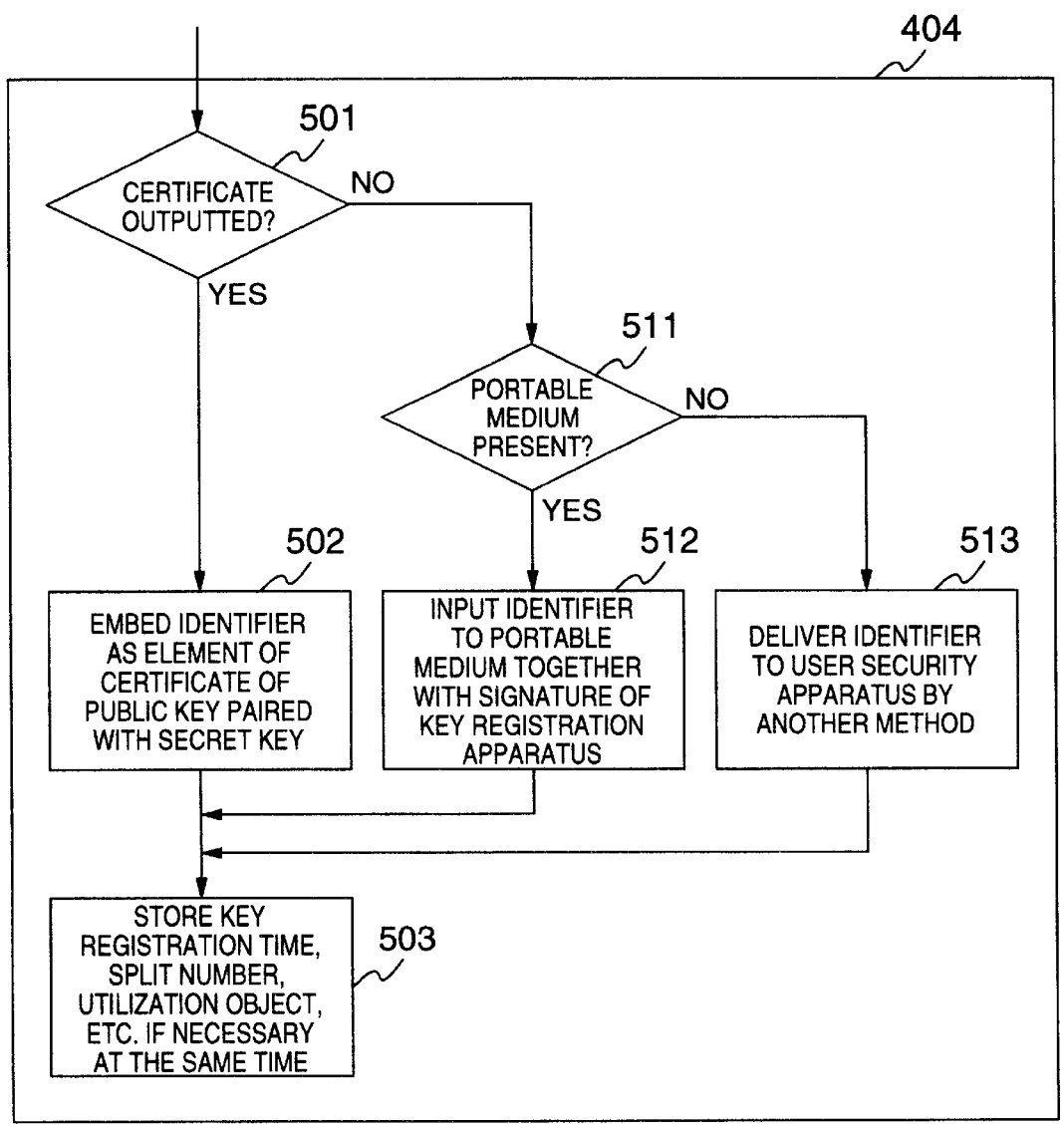
FIG. 5 is a flow chart explaining a procedure for management by a portable medium of a user security apparatus or a public key certificate for preparation of a plurality of key escrowed identifiers in the key registration apparatus according to another embodiment of the present invention.

(2) The escrowed key identifier is stored in a medium (for example, IC card) having the robust characteristic against trouble and separable from the user security apparatus. As shown in FIG. 5, when the key registration apparatus has the function of the certification authority, the public key certificate of (1) is output, otherwise the escrowed key identifier in the respective management methods, stored in the medium is output.

The present invention is not limited to the disclosed embodiments and includes various modifications contained in the spirit of the claims.

What is claimed is:

1. An encrypted data recovery method in a system including a user security apparatus for encrypting a message by means of a data key, preparing enveloped data for encrypting said data key by means of a public key and splitting a secret key paired with said public key, a plurality of key storage apparatuses each keeping each of said split secret keys in custody, a key registration apparatus for managing key storage apparatus certificates and key storage information, and a key recovery apparatus for decrypting said data key by means of said split secret keys and said enveloped data, said system connected to said user security apparatus, said key registration apparatus, said key storage apparatus and said key recovery apparatus through a network, comprising:

a key registration request step of encrypting said split secret keys by means of said public key of said key storage apparatus and requesting registration;

a key registration response step of registering said requested split secret keys, wherein said key registration response step includes a step of preparing a first identifier by means of a random number, a step of sending said first identifier to said user security apparatus, and a key storage request step that includes a step of preparing a second identifier by means of said first identifier and an identifier of said key storage apparatus;

a key storage response step of keeping each of said registered split secret keys in each of said key storage apparatuses in custody in relation to said second identifier;

a data key recovery request step of combining a plurality of partial recovery data keys prepared for each of said key storage apparatuses to decrypt said data key, wherein said data key recovery request step includes a step of calculating said second identifier by means of said first identifier sent to said user security apparatus and said identifier of said key storage apparatus; and a data key recovery response step of partially decrypting said data key encrypted by said public key of a user and contained in said enveloped data by means of said split secret keys of said key storage apparatuses, wherein said data recovery response step includes a step of using said calculated second identifier to search for said split secret key kept in said key storage apparatus in custody.

2. An encrypted data recovery method according to claim 1, wherein said step of sending said first identifier to said user security apparatus includes a step of issuing a public key certificate containing said first identifier.

3. An encrypted data recovery method according to claim 1, wherein said step of sending said first identifier to said user security apparatus including a step of outputting said first identifier to a portable medium in relation to an output time of identifier or information relative to division of said secret key.

4. An encrypted data recovery system comprising a user security apparatus for preparing enveloped data, a key registration apparatus, a key storage apparatus and a key recovery apparatus;

said user security apparatus including:
  key registration client means for requesting a key storage apparatus certificate and splitting a secret key of a user to register said split secret keys in said key registration apparatuses;

said key registration apparatus including:
  key storage certificate notifying server means for producing said key storage apparatus certificate in response to said requirement thereof;
  key registration server means for issuing receipts of said split secret keys and transmitting received split secret keys to a plurality of key storage server means, wherein said key registration server means includes:
    means for preparing a first identifier,
    means for notifying a receipt of said secret key to said key registration client means, and
    means for preparing a second identifier from said first identifier and a key storage apparatus identifier; and
  key storage apparatus information notifying server means for producing key storage apparatus information;

said key storage apparatus including:
  key storage server means for keeping received split secret keys in custody, wherein said key storage server means includes means for keeping said second identifier and said split secret key in relation to each other in custody; and
  data recovery server means for receiving an encrypted data key from data recovery client means to decrypt said encrypted data key by means of said kept split secret keys and returning partially recovered data key to said data recovery client means, wherein said data recovery sever means includes means for searching for said split secret key related to said second identifier sent from said data recovery client means; and said key recovery apparatus including:
  data recovery client means for requiring said key storage apparatus information to the said key storage certificate notifying server means and transmitting said encrypted data key contained in said enveloped data to a plurality of said data recovery server means, combining said data key from a plurality of said partially recovered data keys returned by said data recovery server means to decrypt a ciphertext contained in said enveloped data by means of said combined data key, wherein said data recovery client means includes means for calculating said second identifier from said receipt of said secret key and said key storage apparatus identifier.

5. An encrypted data recovery method in a system including a user security apparatus for encrypting a message by means of a data key, preparing enveloped data for encrypting said data key by means of a public key and splitting a secret key paired with said public key, a plurality of key storage apparatuses each keeping each of said split secret keys in custody, a key registration apparatus for managing key storage apparatus certificates and key storage information, and a key recovery apparatus for decrypting said data key by means of said split secret keys and said enveloped data, said system connected to said user security apparatus, said key registration apparatus, and said key storage apparatus through a network, comprising:

a key registration request step of encrypting said split secret keys by means of said public key of said key storage apparatus and requesting registration;

a key registration response step of registering said requested split secret keys, wherein said key registration response step includes a step of preparing a first identifier by means of a random number, a step of sending said first identifier to said user security apparatus, and a key storage request step that includes a step of preparing a second identifier by means of said first identifier and an identifier of said key storage apparatus; and a key storage response step of keeping each of said registered split secret keys in each of said key storage apparatuses in custody in relation to said second identifier.

6. An encrypted data recovery method according to claim 5, wherein said step of sending said first identifier to said user security apparatus includes a step of issuing a public key certificate containing said first identifier.

7. An encrypted data recovery method according to claim 5, wherein said step of sending said first identifier to said user security apparatus includes a step of outputting said first identifier to a portable medium in relation to an output time of identifier or information relative to division of said secret key.

8. An encrypted data recovery method in a system including a user security apparatus for encrypting a message by means of a data key, preparing enveloped data for encrypting said data key by means of a public key and splitting a secret key paired with said public key, a plurality of key storage apparatuses each keeping each of said split secret keys in custody, a key registration apparatus for managing key storage apparatus certificates and key storage information, preparing a first identifier by means of a random number, and preparing a second identifier by means of said first identifier and an identifier of said key storage apparatuses, and a key recovery apparatus for decrypting said data key by means of said split secret keys and said enveloped data, said system connected to said user security apparatus, said key registration apparatus, said key storage apparatus and said key recovery apparatus through a network, comprising:

a data key recovery request step of combining a plurality of partial recovery data keys prepared for each of said key storage apparatuses to decrypt said data key, wherein said data recovery request step includes a step of calculating said second identifier by means of said first identifier sent to said user security apparatus and said identifier of said key storage apparatus; and a data key recovery response step of partially decrypting said data key encrypted by said public key of a user and contained in said enveloped data by means of said split secret keys of said key storage apparatuses, wherein said data recovery response step includes a step of using said calculated second identifier to search for said split secret key kept in said key storage apparatus in custody.

9. An encrypted data recovery method according to claim 8, wherein said key registration apparatus issues a public key certificate containing said first identifier.

10. An encrypted data recovery method according to claim 8, wherein said key registration apparatus outputs said first identifier to a portable medium in relation to an output time of identifier or information relative to division of said secret key.

11. An encrypted data recovery system including a user security apparatus for encrypting a message using a data key, preparing enveloped data for encrypting said data key using a public key and splitting a secret key paired with said public key, a plurality of key storage apparatuses each keeping each of said split secret keys in custody, and a key registration apparatus for managing key storage apparatus certificates and key storage information, said system connected to said user security apparatus, said key registration apparatus, and said key storage apparatus through a network, comprising:

key registration request means for encrypting said split secret keys using said public key of said key storage apparatus and requesting registration;

key registration response means for registering said requested split secret keys, wherein said key registration response means includes means for preparing a first identifier using a random number, means for sending said first identifier to said user security apparatus, and means for preparing a second identifier using said first identifier and an identifier of said key storage apparatus; and key storage response means for keeping each of said registered split secret keys in each of said key storage apparatuses in custody in relation to said second identifier.

12. An encrypted data recovery system according to claim 11, wherein said means for sending said first identifier to said user security apparatus includes means for issuing a public key certificate containing said first identifier.

13. An encrypted data recovery system according to claim 11, wherein said means for sending said first identifier to said user security apparatus includes means for outputting said first identifier to a portable medium in relation to an output time of identifier or information relative to division of said secret key.

14. An article according to claim 11, wherein said instructions that cause said encrypted data recovery system to send said first identifier to said user security apparatus include instructions that cause said encrypted data recovery system to issue a public key certificate containing said first identifier.

15. An article according to claim 11, wherein said instructions that cause said encrypted data recovery system to send said first identifier to said user security apparatus include instructions that cause said encrypted data recovery system to output said first identifier to a portable medium in relation to an output time of identifier or information relative to division of said secret key.

16. An encrypted data recovery system including a user security apparatus for encrypting a message using a data key, preparing enveloped data for encrypting said data key using a public key and splitting a secret key paired with said public key, a plurality of key storage apparatuses each keeping each of said split secret keys in custody, a key registration apparatus for managing key storage apparatus certificates and key storage information, preparing a first identifier using a random number, sending said first identifier to said user security apparatus, and preparing a second identifier using said first identifier and an identifier of said key storage apparatuses, and a key recovery apparatus for decrypting said data key using said split secret keys and said enveloped data, said system connected to said user security apparatus, said key registration apparatus, said key storage apparatus and said key recovery apparatus through a network, comprising:

data key recovery request means for combining a plurality of partial recovery data keys prepared for each of said key storage apparatuses to decrypt said data key, wherein said data key recovery request means includes means for calculating said second identifier using said first identifier sent to said user security apparatus and said identifier of said key storage apparatus; and data key recovery response means for partially decrypting said data key encrypted by said public key of a user and contained in said enveloped data using said split secret keys of said key storage apparatuses, wherein said data recovery response step includes a step of using said calculated second identifier to search for said split secret key kept in said key storage apparatus in custody.

17. An encrypted data recovery system according to claim 16, wherein said key registration apparatus issues a public key certificate containing said first identifier.

18. An encrypted data recovery system according to claim 16, wherein said key registration apparatus outputs said first identifier to a portable medium in relation to an output time of identifier or information relative to division of said secret key.

19. An article comprising a medium storing instructions, wherein said article is used in an encrypted data recovery system including a user security apparatus for encrypting a message using a data key, preparing enveloped data for encrypting said data key using a public key and splitting a secret key paired with said public key, a plurality of key storage apparatuses each keeping each of said split secret keys in custody, and a key registration apparatus for managing key storage apparatus certificates and key storage information, said system connected to said user security apparatus, said key registration apparatus, and said key storage apparatus through a network, wherein said instructions cause said encrypted data recovery system to:

encrypt said split secret keys using said public key of said key storage apparatus and request registration;

register said requested split secret keys;

prepare a first identifier using a random number;

send said first identifier to said user security apparatus;

prepare a second identifier using said first identifier and an identifier of said key storage apparatus; and keep each of said registered split secret keys in each of said key storage apparatuses in custody in relation to said second identifier.

20. An article comprising a medium storing instructions, wherein said article is used in an encrypted data recovery system including a user security apparatus for encrypting a message using a data key, preparing enveloped data for encrypting said data key using a public key and splitting a secret key paired with said public key, a plurality of key storage apparatuses each keeping each of said split secret keys in custody, a key registration apparatus for managing key storage apparatus certificates and key storage information, preparing a first identifier using a random number, sending said first identifier to said user security apparatus, and preparing a second identifier using said first identifier and an identifier of said key storage apparatuses, and a key recovery apparatus for decrypting said data key using said split secret keys and said enveloped data, said system connected to said user security apparatus, said key registration apparatus, said key storage apparatus and said key recovery apparatus through a network, wherein said instructions cause said encrypted data recovery system to:

combine a plurality of partial recovery data keys prepared for each of said key storage apparatuses to decrypt said data key, calculate said second identifier using said first identifier sent to said user security apparatus and said identifier of said key storage apparatus; and partially decrypt said data key encrypted by said public key of a user and contained in said enveloped data using said split secret keys of said key storage apparatuses, wherein said calculated second identifier is used to search for said split secret key kept in said key storage apparatus in custody.

21. An article according to claim 20, wherein said key registration apparatus issues a public key certificate containing said first identifier.

22. An article according to claim 20, wherein said key registration apparatus outputs said first identifier to a portable medium in relation to an output time of identifier or information relative to division of said secret key.

* * * * *